United States Patent [19]

Ostlinning et al.

[11] Patent Number: 4,464,507

[45] Date of Patent: Aug. 7, 1984

[54] PROCESS FOR THE PRODUCTION OF HIGH MOLECULAR WEIGHT, OPTIONALLY BRANCHED, POLYARYLENE SULPHIDES

[75] Inventors: Edgar Ostlinning, Duesseldorf; Karsten Idel, Krefeld, both of Fed. Rep. of Germany

[73] Assignee: Bayer Aktiengesellschaft, Leverkusen, Fed. Rep. of Germany

[21] Appl. No.: 483,627

[22] Filed: Apr. 11, 1983

[30] Foreign Application Priority Data

Apr. 23, 1982 [DE] Fed. Rep. of Germany ....... 3215259

[51] Int. Cl.³ .............................................. C08K 5/49
[52] U.S. Cl. .................................... 524/710; 528/388
[58] Field of Search ........................ 524/710; 528/388

[56] References Cited

U.S. PATENT DOCUMENTS

| | | | |
|---|---|---|---|
| 3,869,434 | 3/1975 | Campbell et al. | 528/388 |
| 3,876,592 | 4/1975 | Scoggins | 528/381 |
| 4,039,518 | 8/1977 | Campbell | 528/388 |
| 4,096,132 | 6/1978 | Edmonds | 528/384 |
| 4,303,781 | 12/1981 | Krefeld et al. | 528/388 |
| 4,331,801 | 5/1982 | Krefeld et al. | 528/388 |

FOREIGN PATENT DOCUMENTS

| | | |
|---|---|---|
| 2453485 | 5/1975 | European Pat. Off. |
| 0023314 | 2/1981 | European Pat. Off. |
| 0023313 | 2/1981 | European Pat. Off. |
| 0065689 | 12/1982 | European Pat. Off. |
| 0075769 | 6/1983 | European Pat. Off. |

Primary Examiner—Melvyn I. Marquis
Attorney, Agent, or Firm—Connolly and Hutz

[57] ABSTRACT

The invention describes a process for the preparation of optionally branched polyarylene sulphides in organophosphorus compounds as solvents.

3 Claims, No Drawings

PROCESS FOR THE PRODUCTION OF HIGH MOLECULAR WEIGHT, OPTIONALLY BRANCHED, POLYARYLENE SULPHIDES

Polyarylene sulphides and the production thereof are known (cf., for example, U.S. Pat. Nos. 2,538,941; 2,513,188; 3,876,592 and 3,354,129; DE-AS No. 2,453,749, DE-OS No. 2,623,363, U.S. Pat. Nos. 4,038,261; 4,038,259 and 4,038,263; DE-OS No. 2,623,362, U.S. Pat. No. 4,038,262, DE-OS 2,623,333, U.S. Pat. Nos. 4,064,114; 4,038,260 and 4,039,518; JA-OS Nos. 55-54 330 and 75-123 799, U.S. Pat. Nos. 3,117,620; 3,524,835 and 3,839,301 and DE-OS Nos. 2,930,710, 2,930,797 and 3,019,732.

In many of these processes, the polyarylene sulphides obtained do not have high molecular weights and are not thermoplastically processible and a hardening or curing step has to be carried out after the reaction to improve the properties of the end products by chain-extending and branching reactions.

Where high molecular weight, thermoplastically processible polyarylene sulphides are obtained by known processes (cf. DE-OS Nos. 2,930,710, 2,930,797 and 3,019,732, as cited above), it is necessary to use particular catalysts and to apply reaction temperatures which are frequently above the boiling point of the polar solvents, with the result that the reaction has to be carried out under excess pressure.

According to JA-PS No. 75-123 799, hexamethyl phosphoric acid triamide is used as co-solvent in addition to N-methyl(2)pyrrolidone in a pressure reaction in the production of polyarylene sulphides.

According to U.S. Pat. No. 3,876,592, polyarylene sulphides are obtained by reacting $P_2S_5$, alkali metal or alkaline earth metal hydroxides and aromatic polyhalogen compounds in phosphoric acid amides. Thus, polyarylene sulphides which are not of high molecular weight are obtained in yields of less than 60%, based on the aromatic polyhalogen compound, in a pressure reaction.

According to U.S. Pat. No. 4,039,518, hexamethyl phosphoric acid amide, inter alia, is recommended as solvent for the production of polyphenylene sulphide. Unfortunately, there are no examples in support of this recommendation. In general, however, the pressure has to be kept high enough to keep the p-dihalogen benzene and the amide substantially fluid (column 2, lines 64/66).

According to U.S. Pat. No. 3,354,129, however, the products obtained are not thermoplastically processible, even in cases where the reaction is carried out under pressure at elevated temperatures.

By contrast, it has now been found that high molecular weight, optionally branched, polyarylene sulphides may be obtained without having to apply excess pressure providing aromatic polyhalogen compounds and alkali metal sulphides are condensed in known manner in cyclic organophosphorus compounds, preferably 1-alkyl-1-oxophospholanes, optionally in the presence of a catalyst and/or a co-solvent. The polyarylene sulphides obtained may be moulded, extruded and spun into fibres without any need for a curing step.

The synthesis of these cyclic organophosphorus compounds is known from EP-OS No. 0 006 220 and U.S. Pat. No. 2,663,739.

Accordingly, the present invention relates to a process for the production of high molecular weight, optionally branched, polyarylene sulphides from:

(a) dihalogen benzenes, from 50 to 100 mole percent of which correspond to the following general formula:

and from 0 to 50 mole percent of which to the following general formula:

wherein X independently represents fluorine, chlorine, bromine or iodine, preferably chlorine or bromine; and the radicals $R^1$, which may be the same or different, represent hydrogen, $C_1$-$C_{20}$ alkyl, $C_5$-$C_{20}$ cycloalkyl, $C_6$-$C_{24}$ aryl, $C_7$-$C_{24}$ alkaryl or $C_7$-$C_{24}$ aralkyl, and/or two of the radicals $R^1$ may be linked together to form an aromatic or heterocyclic ring and at least one of the radicals $R^1$ represents other than hydrogen; and (b) from 0 to 2.4 mole percent, preferably from 0.4 to 2.0 mole percent, based on the dihalogen benzenes, of an aromatic tri- or tetra-halogen compound corresponding to the following general formula:

$$ArX_n \qquad (III)$$

wherein

Ar represents a $C_6$-$C_{24}$ aromatic or heterocyclic radical;

X is defined as in general formulae (I) and (II); and n represents 3 or 4; and (c) one or more alkali metal sulphides, preferably sodium or potassium sulphide or mixtures thereof, preferably in the form of the hydrates or aqueous mixtures, optionally together with alkali metal hydroxides, the molar ratio of (a+b):c amounting to from 0.85:1 to 1.15:1, preferably from 0.95:1 to 1.05:1; in (d) an organic solvent, optionally using one or more catalysts and/or co-solvents, characterised in that the molar ratio of alkali metal sulphides(s) (c) to the organic solvent (d) is from 1:2 to 1:15, cyclic organophosphorus compounds are used as the organic solvent (d) and the process is carried out over a period of up to 10 hours, at a temperature of from 160° to 240° C., preferably from 165° to 225° C., and in the absence of excess pressure.

Substances corresponding to the prior art, for example alkali metal fluorides, alkali metal phosphates and alkali metal carboxylates, may be employed in the conventional quantities as the optional catalysts.

The optional co-solvents may be N,N-dialkyl carboxylic acid amides of $C_1$-$C_{18}$ aliphatic and or $C_6$-$C_{12}$ aromatic carboxylic acids in a quantity of from 0.02 to 1.0 mole per mole of alkali metal sulphide.

The type of alkali metal sulphides used and the quantity in which they are used correspond to the prior art. Lithium, sodium, potassium and rubidium sulphide, for example, are suitable, sodium sulphide and potassium sulphide being preferred. LiOH, NaOH and KOH may be mentioned as alkali metal hydroxides which may optionally be used for regenerating the alkali metal sulphides from any hydrogen sulphides present. It is also possible in both cases to use mixtures both of the sulphides and of the hydroxides.

The alkali metal sulphides may be dehydrated in one or more steps, for example by distilling off the water from the reaction solution. The partial dehydration step should be completed before addition of the p-dihalogen compounds corresponding to general formulae (I) and (II).

Any N,N-dialkyl carboxylic acid amides used as co-solvent are preferably introduced before dehydration of the alkali metal sulphides. However, it is possible in principle to add the co-solvents together with the polyhalogen compounds to the dehydrated mixture.

In principle, the reactants may be combined in any form. The aromatic dihalogen compounds corresponding to general formulae (I) and (II) and the aromatic tri- and tetra-halogen compounds corresponding to general formula (III) may be added together or separately, continuously, in portions or all at once to the alkali metal sulphide, the solvent or a portion thereof.

According to the present invention, the molar ratio of aromatic meta- to para-dihalogen compounds corresponding to general formulae (I) and (II) should amount to at most 30:70.

In order to obtain thermoplastically processible polyphenylene sulphides, it is particularly preferred to use aromatic p-dihalogen compounds.

However, it is also possible to add the alkali metal sulphide together with the solvent or a portion thereof to the compounds corresponding to general formulae (I), (II) and (III). All the reactants may also be directly combined. Any other combination of the reactants is also possible.

Examples of the aromatic dihalogen compounds corresponding to general formula (I) used in accordance with the present invention are p-difluorobenzene, p-dichlorobenzene, p-dibromobenzene, p-diiodobenzene, 1-fluoro-4-chlorobenzene, 1-fluoro-4-bromobenzene, 1-chloro-4-bromobenzene, 1-chloro-4-iodobenzene, 1-bromo-4-iodobenzene, 1,3-difluorobenzene, 1,3-dichlorobenzene, 1,3-dibromobenzene, 1,3-diiodobenzene, 1-fluoro-3-chlorobenzene, 1-fluoro-3-bromobenzene, 1-fluoro-3-iodobenzene, 1-chloro-3-bromobenzene, 1-chloro-3-iodobenzene and 1-bromo-3-iodobenzene. They may be used either individually or in admixture with one another. 1,4-dichlorobenzene and/or 1,4-dibromobenzene are particularly preferred.

Examples of the aromatic dihalogen compounds corresponding to general formula (II) which may be used in accordance with the present invention are 2,5-dichlorotoluene, 2,5-dichloroxylene, 1-ethyl-2,5-dichlorobenzene, 1-ethyl-2,5-dibromobenzene, 1-ethyl-2-bromo-5-chlorobenzene, 1,2,4,5-tetramethyl-3,5-dichlorobenzene, 1-cyclohexyl-2,5-dichlorobenzene, 1-phenyl-2,5-dichlorobenzene, 1-benzyl-2,5-dichlorobenzene, 1-phenyl-2,5-dibromobenzene, 1-p-tolyl-2,5-dichlorobenzene, 1-p-tolyl-2,5-dibromobenzene, 1-hexyl-2,5-dichlorobenzene, 2,4-dichlorotoluene, 2,4-dichloroxylene, 2,4-dibromocumene, 1-cyclohexyl-3,5-dichlorobenzene and 1-phenyl-3,5-difluorobenzene. They may be used either individually or in admixture with one another.

Examples of the aromatic tri- or tetra-halogen compounds according to general formula (III) used in accordance with the present invention are 1,2,3-trichlorobenzene, 1,2,4-trichlorobenzene, 1,2,4-tribromobenzene, 1,2,4-triiodobenzene, 1,3,5-trichloro-2,4,6-trimethyl-benzene, 1,2,3-trichloronaphthalene, 1,2,4-trichloronaphthalene, 1,2,6-trichloronaphthalene, 2,3,4-trichlorotoluene, 2,3,6-trichlorotoluene, 1,2,3,4-tetrachloronaphthalene, 1,2,4,5-tetrachlorobenzene, 2,2',4,4'-tetrachlorobiphenyl and 1,3,5-trichlorotriazine.

Aromatic di-, tri- and tetra-halogen compounds may be added to the reaction phase both simultaneously and also separately.

Cyclic organophosphorus compounds suitable for use in accordance with the present invention include p-substituted phospholanes and p-substituted phosphanes. Suitable p-substituents include $C_1$–$C_8$-alkyl $C_6$–$C_{12}$ aryl, $C_7$–$C_{20}$ aralkyl and $C_5$–$C_{10}$ cycloalkyl, preferably $C_1$–$C_4$ alkyl.

Cyclic organophosphorus compounds preferably used in accordance with the present invention are those corresponding to the following general formula:

(IV)

wherein $R^2$ represents an α,ω-butylene or α,ω-pentylene radical, which may be substituted, preferably an α,ω-butylene radical, and $R^3$ represents a $C_1$–$C_8$ alkyl, $C_6$–$C_{12}$ aryl, $C_7$–$C_{20}$ aralkyl or $C_5$–$C_{10}$ cycloalkyl radical, preferably a $C_1$–$C_4$ alkyl radical.

Compounds corresponding to general formula (IV) preferably used in accordance with the present invention are 1-methyl-1-oxophospholane, 1-ethyl-1-oxophospholane, 1-phenyl-1-oxophospholane, 1-methyl-1-oxo-phosphane, 1-propyl-1-oxophosphane and 1-phenyl-1-oxophosphane.

The reaction may be carried out over a period of up to 10 hours, although the reaction time is preferably from 0.2 to 8 hours. It is advantageous to increase the reaction temperature in stages during the reaction.

The reaction is carried out under atmospheric pressure. Although not necessary, excess pressure may be applied, in which case excess pressures of from 0.1 to 20 bar are suitable.

The reaction mixture may be worked-up and the polyarylene sulphides isolated by various known techniques.

The polyarylene sulphide may be separated from the reaction solution either directly or after the addition of, for example, water and/or dilute acids using conventional procedures, for example filtration or centrifugation.

Filtration is generally followed by washing with water in order to remove inorganic constituents, such as residues of alkali metal sulphides and alkali metal chlorides, which may adhere to the polymers.

Washing or extraction with other washing liquids, which may even be carried out in addition to or after this washing step, is, of course, also possible.

The polymer may be recovered by distilling off the solvent from the reaction zone, followed by washing in the manner described above.

The polyarylene sulphides according to the present invention may be mixed with other polymers and with pigments and fillers, such as graphite, metal powders, glass powders, quartz powder or glass fibres, or may have the additives normally used for polyarylene sulphides, such as conventional stabilizers or mould release agents, added thereto.

In generally, the melt flow index of polyarylene sulphides is measured in accordance with ASTM 1238-70 at 316° C. using a 5 kg weight and is expressed in g/10 minutes.

With high melt flow values, however, measurement by this technique may give rise to difficulties on account of the high outflow rate of the polymer melt.

Because of this, the melt viscosity $\eta_m$ of the polymer melt (in Pa.s) was determined at 306° C. in dependence upon the shear stress (in Pa.s) by means of an Instron rotation viscosimeter.

In this way, it is possible accurately to determine melt viscosity over a very wide range of from $10^{-1}$ to $10^{-7}$ Pa.s. In an Instron Rheometer, the polymer is melted between a fixed plate and a rotatable cone and the torque of the cone determined. It is possible to calculate melt viscosity as a function of the shear stress from the torque, the angular velocity and the apparatus data. An Instron Model 3250 Rheometer was used (diameter of the cone and the plate 2 cm).

The value quoted is the melt viscosity measured at a shear stress $\tau$ of $10^2$ Pa.

Immediately after isolation from the reaction mixture, the p-polyarylene sulphides according to the present invention generally have melt viscosities of from $0.5 \times 10^3$ to $5 \times 10^5$ Pa.s or even higher, preferably from $1.5 \times 10^3$ to $10^4$ Pa.s. They may be directly processed by extrusion, extrusion blowing, injection moulding or other conventional processing techniques to form for example films, mouldings or fibres which are used for example in the conventional way as automobile components, fittings, electrical components, for example switches, electronic circuit boards, components and apparatus resistant to chemicals, such as pump housings and pump flywheels, etching baths, sealing rings, parts of office machines and telex machines, as well as domestic appliances, valves, ballbearing components.

COMPARISON EXAMPLE 1

By way of comparison, this Example describes the production of polyphenylene sulphide in accordance with U.S. Pat. No. 3,354,129.

129 g of sodium sulphide trihydrate (corresponding to 1 mole of Na$_2$S) and 300 g of N-methyl-2-pyrrolidone are introduced together into a stirrer-equipped autoclave. The mixture is purged with nitrogen and slowly heated to 202° C., a total of 19 ml of water distilling off. The mixture was then cooled to approximately 160° C., followed by the addition of 147 g of p-dichlorobenzene ($\triangleq$ 1 mole) in approximately 50 g of N-methyl-2-pyrrolidone. The reaction mixture is heated to 245° C. over 30 minutes under the initial nitrogen pressure of 2.5 bars, the pressure rising to 10 bars, and the temperature maintained at 245° C. for 3 hours. After cooling to room temperature, a grey solid is isolated and is subsequently subjected to careful washing with water to remove the inorganic impurities. Drying in vacuo at 80° C. leaves 100.3 g (93%) of light brown poly-p-phenylene sulphide having a melt viscosity $\eta_m$ of 4.5 Pa.s (as measured at $\tau = 10^2$ Pa). Thermoplastic processing without curing is not possible.

COMPARISON EXAMPLE 2

By way of comparison, this Example describes the production of p-polyphenylene sulphide in accordance with JA-PS No. 55-54 330.

Example 2

36.06 g ($\triangleq$0.15 mole) of sodium sulphide nonahydrate and 150 ml of N,N'-dimethyl ethylene urea are weighed into a 500 ml reaction vessel equipped with a nitrogen inlet and an outlet for the gas phase. The mixture was purged with nitrogen and slowly heated to from 200° to 225° C. 25.9 g of distillate consisting mainly of water were obtained. After cooling of the reaction vessel, 22.15 g ($\triangleq$0.15 mole) of p-dichlorobenzene were added. The mixture was then heated under atmospheric pressure to from 220°–225° C. and simultaneously purged with nitrogen. After 4 hours, the reaction mixture was emptied into approximately 500 ml of methanol and the product separated by filtration. The crude product was washed for 4 hours in about 1 liter of distilled water at 70° C. After filtration, it was washed in methanol for 2 hours at 50° C, filtered and dried in vacuo at 100° C. 9.39 g (57.9%) of a light grey product having a melt viscosity $\eta_m$ of 0.7 Pa.s at $\tau = 10^2$ Pa) were obtained.

Example 1

48.7 g of sodium sulphide trihydrate ($\triangleq$0.37 mole) and 2.64 g of NaOH dissolved in 19.2 g of H$_2$O were initially introduced together with 150 g of 1-methyl-1-oxophospholane and the mixture dehydrated under an inert gas atmosphere at temperatures of up to 210° C. 38.7 g of a liquid consisting essentially of water distilled off. Thereafter, the mixture was cooled, followed by the addition of 56.85 g ($\triangleq$0.387 mole) of p-dichlorobenzene and 1.07 g (1.6 mole percent) of 1,2,4-trichlorobenzene dissolved in 35 g of 1-methyl-1-oxophospholane. The mixture was then refluxed for 8 hours, the temperature in the reaction mixture rising from an initial value of 170° C. to 220° C. After cooling, the mixture was poured into 1 liter of distilled water and, after acidification, the polyarylene sulphide was separated by filtration. 34.8 g (=85.9%, based on sodium sulphide) of product are isolated after drying in vacuo at 120° C. The melt viscosity $\eta_m$ amounted to 3200 Pa.s ($\tau_m = 10^2$ Pa).

Example 2

48.7 g of sodium sulphide trihydrate (=0.37 mole), 2.64 g of NaOH dissolved in 19.2 g of H$_2$O and 18.9 g of lithium acetate dihydrate (50 mole percent, based on sodium sulphide) were initially introduced together with 150 g of 1-methyl-1-oxophospholane and dehydrated. The further procedure was as in Example 1. 32.4 g of product having a melt viscosity $\eta_m$ of 7860 Pa.s (at $\tau = 10^2$ Pa) were obtained.

Example 3

48.7 g of sodium sulphide trihydrate ($\triangleq$0.37 mole), 10.05 g of NaOH dissolved in 25 g of H$_2$O and 16.1 g of dimethyl acetamide (50 mole percent, based on sodium sulphide) were initially introduced together with 150 g of 1-methyl-1-oxophospholane and dehydrated. The further procedure was as in Example 1. 33.6 g of product having a melt viscosity $\eta_m$ of 11,000 Pa.s (at $\tau = 10^2$ Pa) were isolated.

We claim:

1. A process for the production of high molecular weight, optionally branched, polyarylene sulfides which comprises condensing:

(a) diahalogen benzenes;

(b) aromatic tri- or tetra-halogen compound in an amount of from 0 to 2.4 mol% based on (a);

(c) alkali metal sulphides, where the molar ratio of (a)+(b):(c) is from 0.85:1 to 1.15:1; in an (d) cyclic organophosphorus compound solvent, where the molar ratio of (c):(d) is from 1:2 to 1:15;

over a period of up to 10 hours at a temperature of from 160° to 240° C. and where (a) are dihalogen benzenes from 50 to 100 mol%:

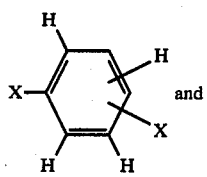

from 0 to 50 mol %:

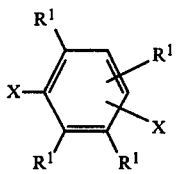

wherein X represents fluorine, chlorine, bromine and iodine; and $R^1$, which may be the same or different, represents hydrogen, $C_1$-$C_{20}$ alkyl, $C_5$-$C_{20}$ cycloalkyl, $C_6$-$C_{24}$ aryl, $C_7$-$C_{24}$ alkaryl or $C_7$-$C_{25}$ aralkyl and/or two of the $R^1$ substituents may be linked together to form an aromatic or heterocuclic ring and at least one of the $R^1$ substituents represents other then hydrogen; and (b) is an aromatic tri- or tetra-halogen compound:

$$ArX_n$$

wherein Ar represents an aromatic or heterocyclic ring containing from 6 to 24 carbon atoms; and n represents 3 or 4; and (d) are cyclic organophosphorus compound solvents:

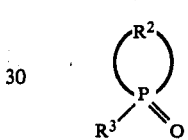

wherein $R^2$ represents an unsubstituted or substituted $\alpha,\omega$-butylene or $\alpha,\omega$-pentylene; $R^3$ represents a $C_1$-$C_8$ alkyl, $C_6$-$C_{12}$ aryl, $C_7$-$C_{20}$ aralkyl or $C_5$-$C_{10}$ cycloalkyl.

2. A process as claimed in claim 1, wherein the condensation temperature is from 165° to 225° C.

3. A process as claimed in claim 1, wherein $R^2$ represents an $\alpha,\omega$-butylene and $R^3$ represents a $C_1$-$C_4$ alkyl.

* * * * *